United States Patent [19]

Ebihara et al.

[11] Patent Number: 5,452,702
[45] Date of Patent: Sep. 26, 1995

[54] SIDE-VALVE TYPE INTERNAL COMBUSTION ENGINE

[75] Inventors: Toshio Ebihara; Hideo Urata; Yoshikazu Yamada, all of Wako, Japan

[73] Assignee: Honda Giken Kogyo Kabushiki Kaisha, Tokyo, Japan

[21] Appl. No.: 322,751

[22] Filed: Oct. 13, 1994

[30] Foreign Application Priority Data

Oct. 21, 1993 [JP] Japan .................................. 5-263277

[51] Int. Cl.⁶ ........................................ F02B 19/16
[52] U.S. Cl. ........................................ 123/658; 123/193.5
[58] Field of Search ............................. 123/661, 193.3, 123/193.5, 257, 285, 658

[56] References Cited

U.S. PATENT DOCUMENTS

| | | | |
|---|---|---|---|
| 2,073,620 | 3/1937 | Bicknell | 123/658 |
| 2,090,175 | 8/1937 | Alborn | 123/658 |
| 2,232,759 | 2/1941 | Aske | 123/658 |
| 2,338,183 | 1/1944 | Jagersberger | 123/658 |
| 2,770,227 | 11/1956 | Haigh et al. | 123/661 |
| 2,833,265 | 5/1958 | Hindle et al. | 123/661 |
| 4,103,664 | 8/1978 | Iida et al. | 123/658 |
| 5,105,795 | 4/1992 | Ozawa et al. | 123/661 |
| 5,237,972 | 8/1993 | Groff et al. | 123/661 |
| 5,307,773 | 5/1994 | Suzuki | 123/661 |
| 5,372,105 | 12/1994 | Nagao et al. | 123/661 |

FOREIGN PATENT DOCUMENTS

| | | | |
|---|---|---|---|
| 854866 | 4/1940 | France | 123/658 |
| 1127680 | 12/1956 | France | 123/661 |
| 848181 | 9/1960 | United Kingdom | 123/661 |

*Primary Examiner*—David A. Okonsky
*Attorney, Agent, or Firm*—Armstrong, Westerman, Hattori, McLeland & Naughton

[57] ABSTRACT

In a side-valve internal combustion engine, a combustion chamber in a cylinder head is defined into a substantially triangular pyramid shape having a triangular opened edge. A third angle portion of the opened edge formed by a first slant having a relatively small angle and a second slant having a relatively large angle is offset from an axis of a cylinder bore toward the first slant. Thus, it is possible to a swirl of an air-fuel mixture during an intake stroke to uniformize the air-fuel ratio, thereby providing a reduction in fuel consumption, and producing a swirl of combustion gas during an expansion stroke to eliminate the non-uniformity of combustion, thereby providing an increase in power output and a reduction in amount of unburned components in the exhaust gas.

5 Claims, 4 Drawing Sheets

SIDE-VALVE TYPE INTERNAL COMBUSTION ENGINE

BACKGROUND OF THE INVENTION

1. Field of the Invention

The present invention relates to a side-valve type internal combustion engine, and particularly, to an improvement in a side-valve type internal combustion engine including valve seats disposed in an upper surface of a cylinder block having a cylinder bore and located in intake and exhaust ports which are juxtaposed in a circumferential direction of a cylinder bore and opened and closed by intake and exhaust valves. A combustion chamber, defined in a cylinder head joined to the upper surface of the cylinder block, permits communication between the intake and exhaust ports and the cylinder bore. A spark plug is mounted in the cylinder head with its electrode facing the combustion chamber.

2. Description of the Prior Art

In such prior art type internal combustion engine, if a swirl of an air-fuel mixture is produced in the cylinder bore, during an intake stroke, the air-fuel ratio of the air-fuel mixture can be uniformized.

Thus, there is a conventionally known side-valve type internal combustion engine in which a side wall of the combustion chamber, adjacent the intake valve, is formed to extend toward an axis of the cylinder bore so as to produce the swirl of the air-fuel fixture within the cylinder bore (see, for example, Japanese Utility Model Publication Laid-open No. 4504/52).

In the prior art engine of the above-described type, however, the flame, i.e., the combustion gas, is not spread over the entire interior of the cylinder bore during an expansion stroke. Such lack of spread results in a non-uniform combustion. Hence, it is difficult to reduce the amount of unburned components in the exhaust gas.

SUMMARY OF THE INVENTION

Accordingly, it is an object of the present invention to provide a side-valve internal combustion engine, of the type described above, wherein a swirl of an air-fuel mixture can be produced during an intake stroke to uniformly spread the air-fuel mixture, providing a reduction in specific fuel consumption and producing a swirl of combustion gas to eliminate non-uniformity of combustion during an expansion stroke. Increase in power output and reduction in amount of unburned components in an exhaust gas results.

To achieve the above object, according to a first aspect and feature of the present invention, there is provided a side-valve type internal combustion engine comprising, valve seats disposed in an upper surface of a cylinder block having a cylinder bore and located in intake and exhaust ports which are juxtaposed in a circumferential direction of a cylinder bore and opened and closed by intake and exhaust valves, a combustion chamber, defined in a cylinder head joined to the upper surface of the cylinder block to permit the communication between the intake and exhaust ports and the cylinder bore, and a spark plug mounted in the cylinder head with its electrode facing the combustion chamber. The combustion chamber is formed into a substantially triangular pyramid shape including a substantially triangular opened edge, having a first angle portion sandwiching one of the intake and exhaust valves, a second angle portion sandwiching the other of the intake and exhaust valves, and a third angle portion located in the vicinity of an axis of the cylinder bore, all with a single apex, and wherein a first slant surrounded by the apex and the first and third angle portions is formed at a relatively smaller angle, and a second slant surrounded by the apex and the second and third angle portions is formed at a relatively larger angle.

In addition to the above first feature, according to a second aspect and feature of the present invention, the third angle portion of the opened edge of the combustion chamber is offset from the axis of the cylinder bore toward the first slant.

In addition to the above first and second feature, according to a third aspect and feature of the present invention, the electrode of the spark plug is disposed at or in the vicinity of the apex of the combustion chamber.

With the first feature of the present invention, during an intake stroke, the air-fuel mixture, drawn into the cylinder bore along the first slant of smaller angle in the combustion chamber, produces a swirl within the cylinder bore. The air-fuel mixture is drawn into the cylinder bore along the second slant of larger angle exhibits a push-in force, providing a uniformization of the air-fuel ratio of the air-fuel mixture and an increase in filling efficiency of the air-fuel mixture into the combustion chamber. Further, it contributes to a reduction in fuel consumption. During an expansion stroke, combustion gas is permitted to flow along the first slant having the smaller angle into the cylinder bore by a wedge effect to produce a swirl, resulting in uniformity of combustion. Consequently, in cooperation with an enhanced combustion efficiency and an increased filling efficiency, high output can be provided, with the amount of unburned components in the exhaust gas reduced.

With the second feature of the present invention, because the third angle portion of the opened edge of the combustion chamber is offset, toward the first slant, from the axis of the cylinder bore, all of the air-fuel mixture, guided along the first slant, and the combustion gas can be directed in a tangent direction of the cylinder bore to produce a more powerful swirl.

With the third feature of the present invention, by the fact that the electrode of the spark plug is disposed at or in the vicinity of the apex of the combustion chamber, the combustion gas generated by the ignition of the spark plug can be forcibly spread from the apex toward the opened edge of the combustion chamber and effectively guided by the first slant, having the smaller angle, to produce a powerful swirl within the cylinder bore.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment in connection with the accompanying drawings.

Figure 1:
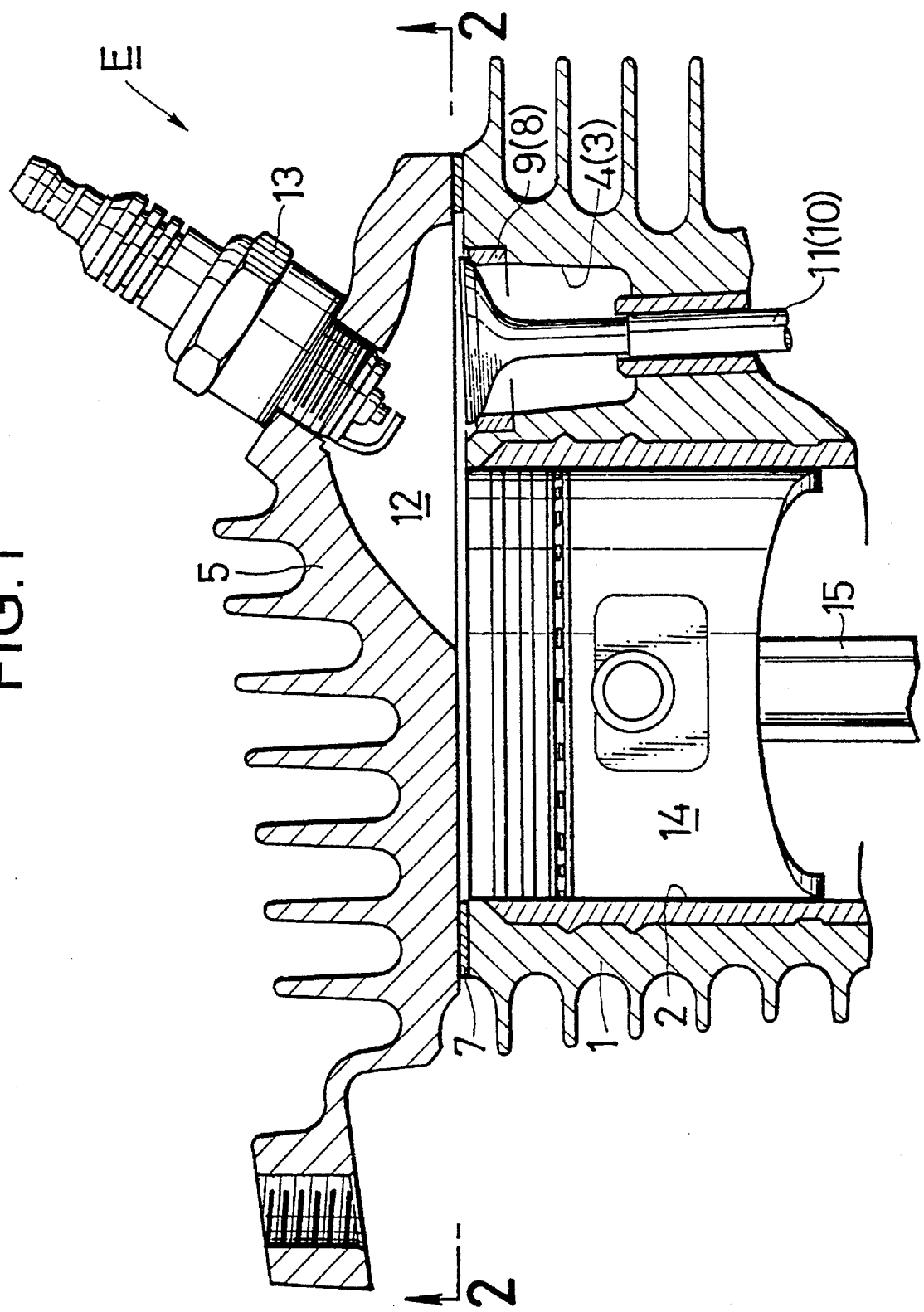
FIG. 1 is a vertical sectional front view taken along a line 1—1, in FIG. 2, of a side-valve internal combustion engine according to a preferred embodiment of the present invention.
Figure 2:
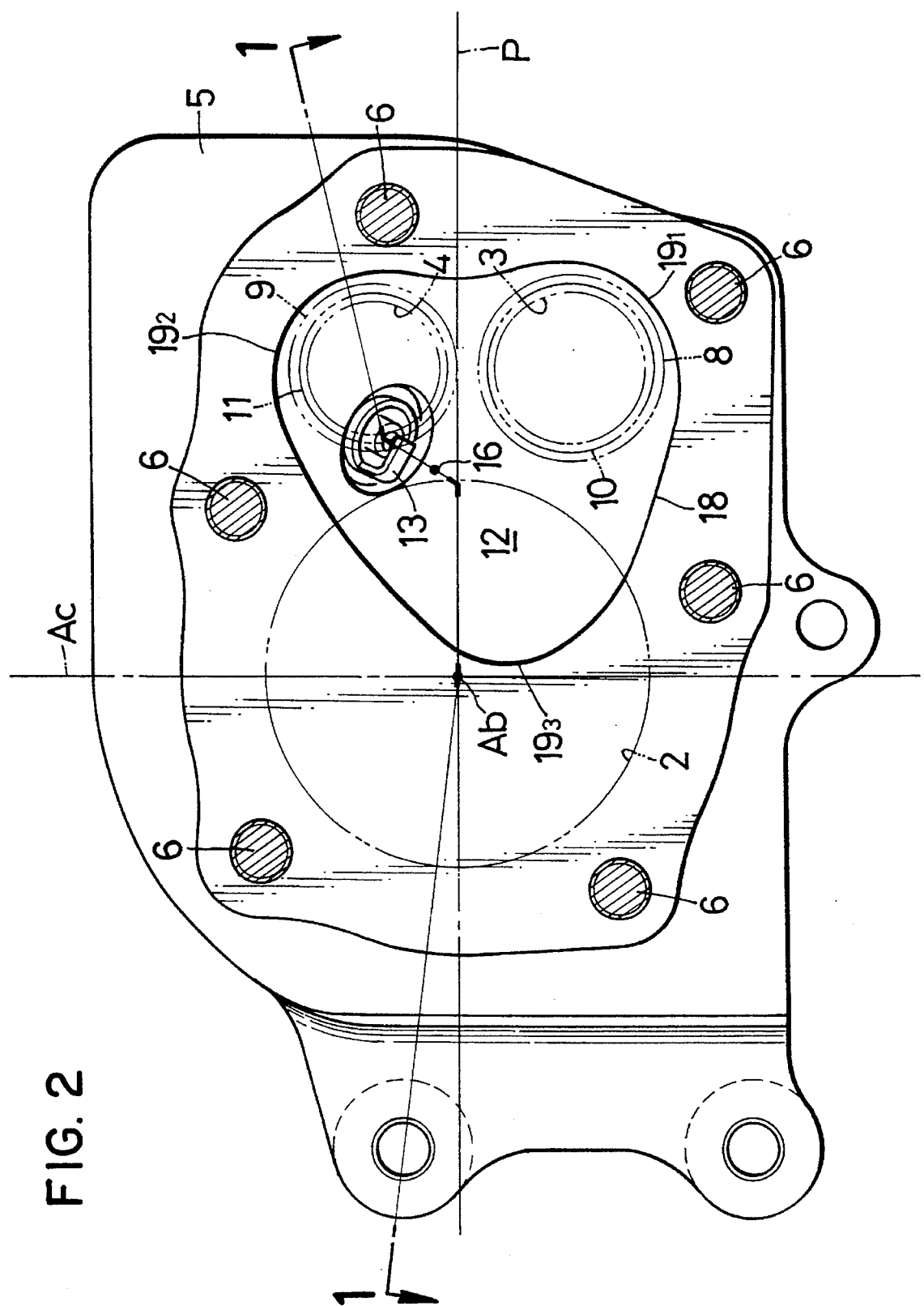
FIG. 2 is a sectional view taken along line 2—2, FIG. 1.

Referring first to FIGS. 1 and 2, inner ends of an intake port 3 and an exhaust port 4, as well as a cylinder bore 2, open into an upper surface of a cylindrical block 1 of an internal combustion engine. A cylinder head 5 is joined to the upper surface of the cylinder block 1 through a gasket 7 by a plurality of bolts 6, FIG. 2, to cover ports 3 and 4 and cylinder bore 2.

Valve seats 8 and 9 are formed at inner end edges of intake and exhaust ports 3 and 4, respectively, and are each embedded in cylinder block 1. The intake and exhaust ports 3 and 4 are opened and closed by unseating and seating of valve heads of intake and exhaust valves 10 and 11 from and onto the valve seats 8 and 9, respectively.

A piston 14 is vertically slidably received in the cylinder bore 2 and connected to a crankshaft (not shown) through a connecting rod 15.

A combustion chamber 12 is defined in the cylinder head 5 to permit communication between the intake and exhaust ports 3 and 4 and with cylinder bore 2. A spark plug 13 is threadedly fitted into the cylinder head 5 with an electrode of the spark plug 13 facing the combustion chamber 12.

As shown in FIG. 2, the valve seat 8 and 9, for the intake and exhaust ports 3 and 4, respectively, are disposed on opposite sides of a plane P including an axis Ab of the cylinder bore 2 and perpendicular to an axis Ac of the crankshaft.

Figure 3:
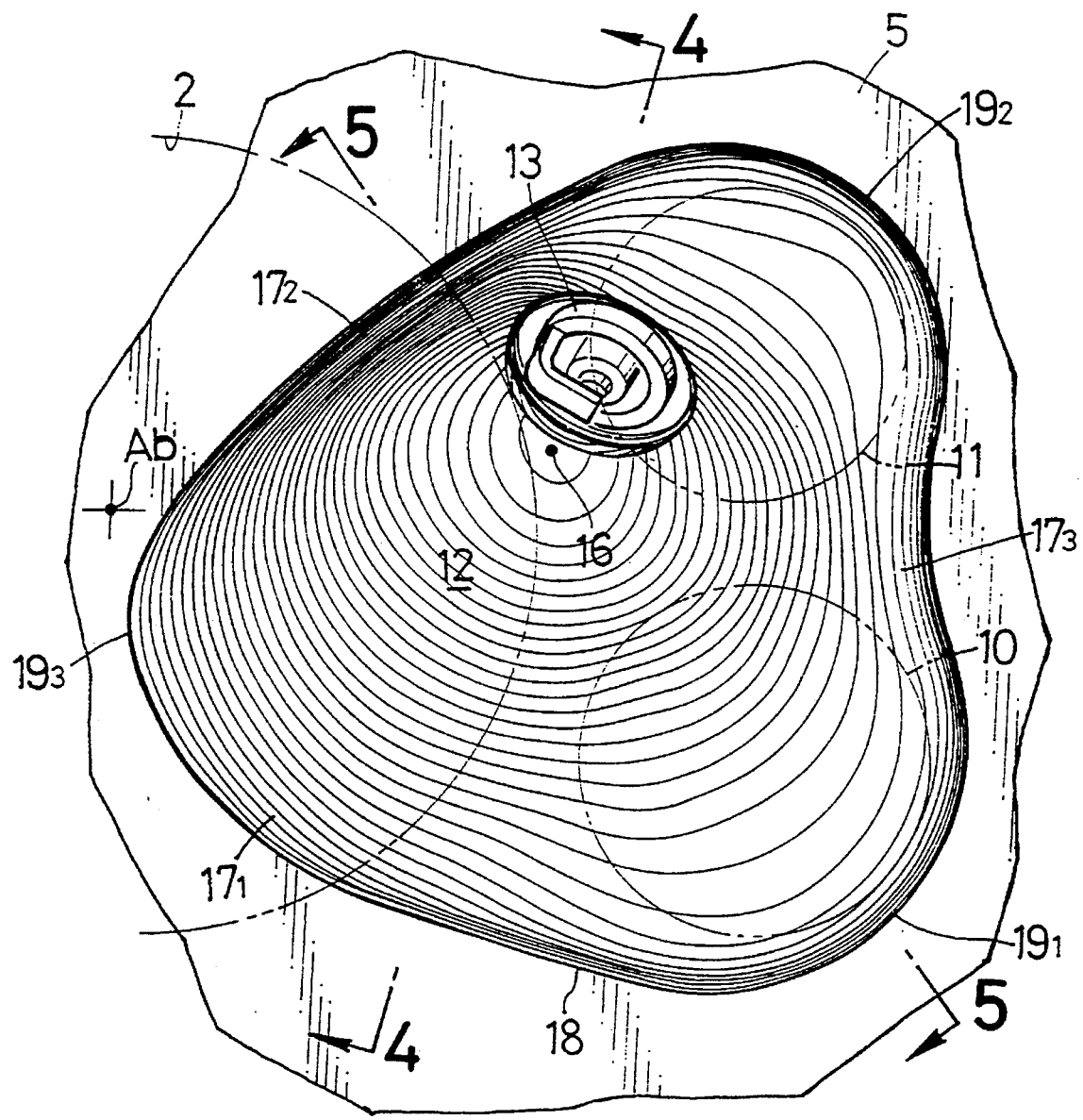
FIG. 3 is a contour line diagram illustrating a shape of a combustion chamber in a cylinder head looking into such combustion chamber.

FIG. 3 is a contour line diagram illustrating the shape of the combustion chamber 12 As can be seen from FIG. 3, the combustion chamber 12 assumes a substantially triangular pyramid shape with each portion roundish. More particularly, the combustion chamber 12 has a single roundish apex 16, three roundish slants $17_1$, $17_2$ and $17_3$ extending downwardly from the apex 16, and a triangular roundish opened edge 18 formed at lower ends of such slants. Preferably, the opened edge 18, FIG. 3, is disposed so as to be slightly offset from the axis Ab toward the first slant $17_1$, such that first and second angle portions $19_1$ and $19_2$, of the opened edge 18, sandwich the valve heads of the intake and exhaust valves 10 and 11. The third angle portion 173 is located in the vicinity of the axis Ab of the cylinder bore 2. The first slant $17_1$ (see FIG. 4) is surrounded by the apex 16 and the first and third angle portions $19_1$ and $19_3$. The second slant $17_2$ (see FIG. 5) is surrounded by the apex 16 and the second and third angle portions $19_2$ and $19_3$. In the combustion chamber 12, the angle $\alpha$ of the first slant $17_1$, with respect to a bottom of the cylinder head 5, is set at a relative small value e.g., in a range of 30° to 50°. The angle $\beta$ of the second slant $17_2$ with respect to the bottom of the cylinder head 5 is set at a relatively large value, e.g., in a range of 60° to 90°.

The spark plug 13 is disposed such that the electrode thereof is located at or in the vicinity of the apex 16 and directed toward the first slant $17_1$.

Figure 4:
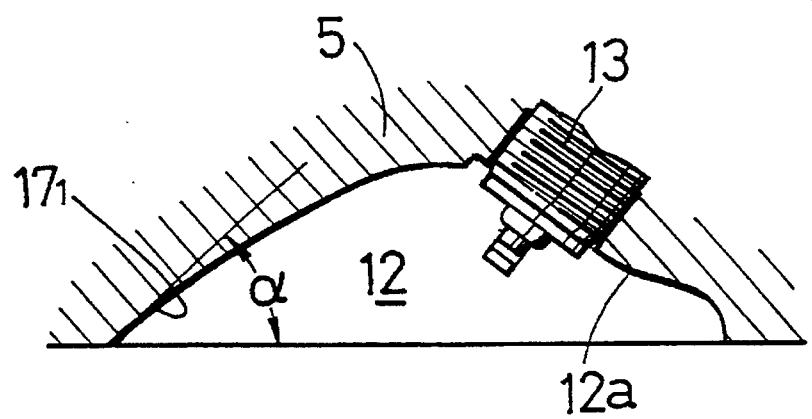
FIG. 4 is a sectional view taken along a line 4—4 in FIG. 3.
Figure 5:
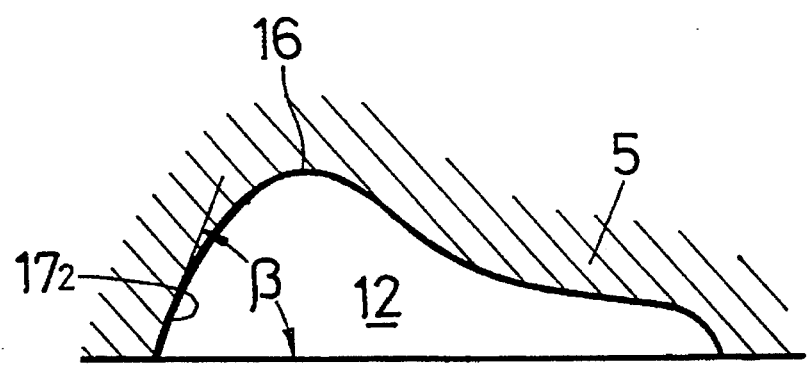
FIG. 5 is a sectional view taken along a line 5—5 in FIG. 3.

An inner wall portion 12a, FIG. 4, of the combustion chamber 12, immediately below the spark plug 13, is curved inwardly of the combustion chamber 12. A lower portion of the third slant $17_3$, surrounded by the apex 16 and the first and second angle portion $19_1$ and $19_2$, is also curved inwardly of the combustion chamber 12. This causes the volume of the combustion chamber 12 to be set at a small value.

The operation of this embodiment will be described below.

At an intake stroke of the engine in which the intake valve 10 is opened and the piston 14 is lowered, an air-fuel mixture, produced in a carburetor (not shown), flows through the open intake port 3 and into the combustion chamber 12 in a first directed to the apex 16 of the combustion chamber 12. After reaching the apex 16, such air-fuel mixture is drawn into the cylinder bore 2, along the first and second slants $17_1$ and $17_2$.

During such intake stroke, because the third angle portion $19_3$ of the opened edge 18 of the combustion chamber 12 is offset from the axis Ab of the cylinder bore 2, toward the first slant $17_1$, the air-fuel mixture guided by the first slant $17_1$ of smaller angle $\alpha$ flows in a tangent direction with respect the cylinder bore 2 to produce a powerful swirl of the air-fuel mixture within the cylinder bore 2, while the air-fuel mixture guided by the second slant $17_2$ of larger angle $\beta$, flows in a substantially axial direction of the cylinder bore 2 to exhibit a downward pushing force.

The swirl of the air-fuel mixture within the cylinder bore 2 contributes to the uniformization of the air-fuel ratio. The downward pushing force of the air-fuel mixture contributes to an increase in filling efficiency. Therefore, if the air-fuel is ignited by the spark plug 13 at the end of the following compression stroke, a good combustion can be produced to provide a reduction in fuel consumption and high power output.

Especially, at the time when the air-fuel mixture, compressed in the combustion chamber 12, is ignited, the combustion gas generated by the ignition is forcibly spread from the apex 16 of the combustion chamber 12 toward the opened edge 18, because the electrode of the spark plug 13 is located at or in the vicinity of the apex 16 of the combustion chamber 12. The combustion gas is passed along the first slant $17_1$ of smaller angle $\alpha$ into a gap between opposed surfaces of the cylinder head 5 and the piston 14 by a wedge effect to produce a swirl within the cylinder bore 2, while, at the same time, applying a lowering force to the piston 14. In this manner, the combustion gas is spread over the entire inside of the cylinder bore 2. Therefore, a high combustion efficiency is provided and a high power output is exhibited. Also the amount of unburned components (HCs) in an exhaust gas discharged into the exhaust port 4 at an exhaust stroke is decreased considerably, Although the embodiment of the present invention has been described in detail, it will be understood that the present invention is not limited to the above-described embodiment, and various modifications may be made without departing from the subject matter and scope of the invention. For example, the positions of the intake and exhaust valves 10 and 11 may be replaced by each other.

What is claimed is:

1. A side-valve type internal combustion engine comprising valve seats disposed in an upper surface of a cylinder block having a cylinder bore and located in intake and exhaust ports which are juxtaposed in a circumferential direction of a cylinder bore and opened and closed by intake and exhaust valves, a combustion chamber defined in a cylinder head joined to the upper surface of the cylinder block to permit the communication between the intake and exhaust ports and the cylinder bore, and a spark plug mounted in the cylinder head with its electrode in and facing the combustion chamber, wherein said combustion chamber is formed into a substantially triangular pyramid shape including a substantially triangular opened edge having a first angle portion sandwiching one of said intake and exhaust valves, a second angle portion sandwiching the other of said intake and exhaust valves, and a third angle portion located in the vicinity of an axis of the cylinder bore, said combustion chamber having a single apex, and wherein a first slant surrounded by said apex and said first and third angle portions is formed at a relatively small angle, and a second slant surrounded by said apex and said second and third angle portions is formed at a relatively large angle.

2. A side-valve type internal combustion engine according to claim 1, wherein said third angle portion of said triangular opened edge of said combustion chamber is offset toward said first slant from the axis of said cylinder bore.

3. A side-valve type internal combustion engine according to claim 1 or 2, wherein said electrode of the spark plug is disposed at or in the vicinity of said apex of the combustion chamber.

4. A side-valve type internal combustion engine according to claim 1 or 2, wherein said first slant has an inclination angle with respect to a bottom of said cylinder head in a range of 30° to 50°, and said second slant has an inclination angle with respect to said bottom of said cylinder head in a range of 60° to 90°.

5. A side-valve type internal combustion engine according to claim 3, wherein said first slant has an inclination angle with respect to a bottom of said cylinder head in a range of 30° to 50°, and said second slant has an inclination angle with respect to said bottom of said cylinder head in a range of 60° to 90°.

* * * * *